3,149,111
DINITROPHENYLMERCAPTOPURINES

George H. Hitchings, Tuckahoe, Gertrude B. Elion, Bronxville, and Lottie E. Mackay, Pleasantville, N.Y., assignors to Burroughs Wellcome & Co. (U.S.A.) Inc., Tuckahoe, N.Y., a corporation of New York
No Drawing. Filed Sept. 29, 1961, Ser. No. 141,582
3 Claims. (Cl. 260—252)

This invention relates to a group of 6-thiopurine compounds found to have pharmacological activity in the treatment of induced tumors in animals such as rodents.

The use of 6-mercaptopurine and thioguanine

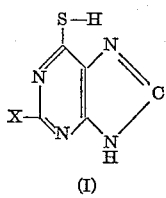

(I)

(I: X=H and X=NH$_2$, respectively) in the treatment of acute leukemia and of certain related disorders is now established. A more recent development is the use of 6-mercaptopurine in the suppression of the immune response to transplanted organs. This is still in an experimental stage but holds great promise. In certain recent experiments in dogs, it has been possible to transplant kidneys from one animal to another and maintain the transplanted organ as a functioning part of the body for several months. Such an operation in humans up to the present day has only been possible between identical twins, which somewhat limits its applicability. The difficulty arises from the fact that the body develops antibodies to the transplanted tissue and these destroy that tissue. Development of these antibodies apparently can be suppressed for protracted periods by administration of 6-mercaptopurine.

The compounds of the present invention are represented by Formula II wherein X may be hydrogen or NH$_2$.

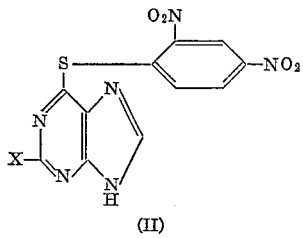

(II)

A number of 6-arylthiopurines is disclosed in U.S. application Serial No. 853,686, filed Nov. 18, 1959, of which this is a continuation-in-part, now abandoned. Of the various aryl substituents shown therein, it has been found that markedly superior results are obtained with nitro groups preferably in the 2' and 4' positions. Such substitution on a phenyl ring is known to labilize a substituent in the p-position to nucleophilic attack. It is believed that when the drug has been absorbed, such attack takes place on the part of nucleophils present in the body, presumably amino and sulfhydryl compounds, liberating a compound of Formula I. The attack could be through ordinary chemical action or through enzymatic action. However, that does not alter the general situation since many enzymes contain amino and sulfhydryl groups and presumably act through normal chemical procedures.

The use of a protected form of mercaptopurine or thioguanine may have appreciable advantages although it is not yet possible to rationalize on these matters in detail. Such compounds as II may at times be better absorbed than the parent compound, or once absorbed, may be distributed differently in the tissues. Further, the gradual release of I may result in a different pattern of availability to different parts of the organism. Whatever the reason, it has been found through metabolic studies that excretion of various break-down products often proceeds at markedly different rates and the proportion of various products formed is sometimes quite different when the protected derivatives are administered from the proportion when the parent compounds are administered.

The compounds of the present invention are conveniently prepared by the reaction of a 2,4-dinitrohalogenobenzene, usually 2,4-dinitrochlorobenzene, with the anion of the 6-thiopurine. In practice, this may be accomplished by the use of sodium hydroxide plus the thiopurine in aqueous-alcoholic solution. An alternative is the use of potassium carbonate as base in dimethyl formamide as solvent.

EXAMPLE 1
*2-Amino-6-(2',4'-Dinitrophenyl)Mercaptopurine*

A mixture of 5 g. of 2-amino-6-mercaptopurine, 6.4 g. of 2,4-dinitrochlorobenzene, 4.6 g. of anhydrous potassium carbonate and 65 ml. of dimethylformamide was heated at 60° with mechanical stirring for 6 hours. The reaction mixture was cooled and the precipitate of crude product collected by filtration. A further crop of product was obtained by diluting the filtrate to 450 ml. with water and adjusting the acidity to a value of pH 7 with acetic acid. The two precipitates were combined, dissolved in 200 ml. of 0.2 N sodium hydroxide, filtered and the product was reprecipitated by the addition of acetic acid to a value of pH 7. The 2-amino-6-(2',4'-dinitrophenyl)mercaptopurine melts at 235° C.

EXAMPLE 2
*6-(2',4'-Dinitrophenyl)Mercaptopurine*

To a solution of 5 g. of 6-mercaptopurine hydrate in 15 ml. of 2 N sodium hydroxide and 26 ml. of 95% ethanol was added 6.6 g. of 2,4-dinitro-1-chlorobenzene. The reaction mixture was stirred for four hours at room temperature. The yellow precipitate of 6-(2',4'-dinitrophenyl)mercaptopurine was collected by filtration. It was purified by solution in 150 ml. of 0.4 N sodium hydroxide and reprecipitation at pH 5 by the addition of acetic acid. After being washed with water and acetone and dried at 100°, the product (9.0 g.) melted at 239–240°. Its ultraviolet absorption spectrum shows λmax= 278, 340 mμ at pH 1 and λmax=278, 340–350 mμ at pH 11.

TABLE I

| Compound | Dose, mg./kg. | TWI | T/N | Toxicity | BWI |
|---|---|---|---|---|---|
| 6-(2',4'-dinitrophenyl)-mercaptopurine. | 10 i.p. | 1.25 | 6/6 | 0/6 | 1.10 |
| | 25 i.p. | 0.22 | 5/6 | 0/6 | 0.99 |
| | 75 i.p. | 0.08 | 4/6 | 0/6 | 1.11 |
| | 150 i.p. | 0.22 | 6/6 | 0/6 | 0.82 |
| | 75 p.o. | 0.73 | 6/6 | 0/6 | 1.24 |
| | 150 p.o. | 0.27 | 6/6 | 0/6 | 0.75 |
| 2-Amino-6-(2',4'-dinitrophenyl)mercaptopurine. | 15 i.p. | 0.16 | 6/6 | 0/6 | 0.86 |
| | 25 i.p. | 0.16 | 4/6 | 0/6 | 0.95 |
| | 50 i.p. | Toxic | | 5/6 | |
| | 15 p.o. | 0.68 | 6/6 | 0/6 | 0.89 |
| | 25 p.o. | 0.41 | 6/6 | 0/6 | 1.19 |
| | 50 p.o. | 0.007 | 1/5 | 1/6 | 0.75 |

TABLE II

| Compound | Dose, mg./kg. | TWI | T/N | Toxicity | BWI |
|---|---|---|---|---|---|
| 6-(2',4'-dinitrophenyl)-mercaptopurine. | 10 i.p. | 0.40 | 9/12 | 0/12 | 0.95 |
|  | 25 i.p. | 0.02 | 4/5 | 1/6 | 0.9 |
|  | 50 i.p. | 0.02 | 2/5 | 7/12 | 0.7 |
|  | 10 p.o. | 0.32 | 6/6 | 0/6 | 0.8 |
|  | 25 p.o. | 0.45 | 9/12 | 0/12 | 0.9 |
|  | 50 p.o. | 0.00 | 0/6 | 0/6 | 0.95 |
|  | 100 p.o. | 0.03 | 3/5 | 1/6 | 0.9 |
| 2-Amino-6-(2',4'-dinitrophenyl)mercaptopurine. | 2 i.p. | 0.61 | 11/12 | 0/12 | 1.0 |
|  | 5 i.p. | 0.03 | 6/12 | 0/12 | 0.95 |
|  | 2 p.o. | 0.48 | 6/6 | 0/6 | 1.0 |
|  | 5 p.o. | 0.09 | 9/12 | 0/12 | 1.0 |

In the tables illustrated above, results are set forth on the experimental administration of compounds to mice bearing Sarcoma 180, Table I, or Adenocarcinoma 755, Table II. The second column of the table signifies the tumor weight index which is the average weight of the tumors in treated animals divided by the average weight of the untreated or control group of animals. The third column indicates the tumor number or the number of significantly sized tumor growths in the animals undergoing treatment. The toxicity indicates the fatalities and the number of animals which were treated, while the last column is the body weight index of the animals showing the degree of weight loss following the medication.

What we claim is:
1. A compound represented by the formula

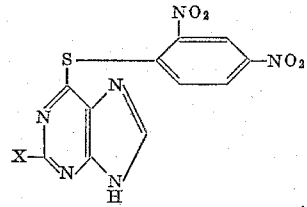

wherein X is selected from the class consisting of $NH_2$ and hydrogen.
2. 6-(2',4'-dinitrophenyl)mercaptopurine.
3. 2-amino-6-(2',4'-dinitrophenyl)mercaptopurine.

No references cited.